United States Patent

Houston

[15] 3,671,776

[45] June 20, 1972

[54] DIGITAL SIGNAL SYNCHRONIZING SYSTEM

[72] Inventor: Robert D. Houston, Webster, N.Y.

[73] Assignee: Xerox Corporation, Rochester, N.Y.

[22] Filed: May 1, 1970

[21] Appl. No.: 33,805

[52] U.S. Cl. ..........................307/269, 178/69.5 R, 328/63, 328/72, 328/133

[51] Int. Cl. .....................................H03k 5/00, H03k 17/00

[58] Field of Search .............307/269; 328/63, 72, 133, 155; 178/69.5 R

[56] References Cited

UNITED STATES PATENTS

| | | | |
|---|---|---|---|
| 3,102,164 | 8/1963 | Roiz | 178/69.5 |
| 2,980,858 | 4/1961 | Grondin et al. | 328/63 |
| 3,185,963 | 5/1965 | Peterson et al. | 307/269 X |
| 3,209,265 | 9/1965 | Baker et al. | 328/63 |
| 3,544,717 | 12/1970 | Smith | 178/69.5 |

*Primary Examiner*—Stanley D. Miller, Jr.
*Attorney*—James J. Ralabate, Irving Keschner and John E. Beck

[57] ABSTRACT

A digital signal synchronizing system wherein a locally generated timing signal is compared with received binary data. If the timing signal lags the bit rate of the binary data, pulses are added to the timing signal and if the timing signal leads the binary data, pulses are deleted from the timing signal. Means are provided for controlling the bandwidth of the system and the system, in addition, has a phase versus frequency response which is substantially constant over the range of operating frequencies.

1 Claim, 3 Drawing Figures

INVENTOR.
ROBERT D. HOUSTON
BY

ATTORNEY

DIGITAL SIGNAL SYNCHRONIZING SYSTEM

BACKGROUND OF THE INVENTION

In many communication systems, information is transmitted which is valueless except as it is related to some time value or time scale which is common to both transmitter and receiver. A common example is television, where the received picture is completely unintelligible unless the receiver scanning is locked in phase and frequency with the transmitter scanning. Similar problems exist in time division multiplexing telemetering systems, facsimile systems and the like. In such systems information is transmitted in a repetitive series of uniform short intervals. Most of each interval is given over to the transmission of pictures or other data, but part of the interval is given over to the transmission of a synchronizing signal of predetermined form. A common problem is to reliably detect the frequency and phase of the synchronizing signal in the presence of noise, distortion, dropout or of information signals which resemble the synchronizing signals. The transmission of a separate synchronizing signal unnecessarily adds to the complexity of the transmission equipment and in addition decreases the information volume that can be transmitted due to the fact that part of the bandwidth is taken by the synchronizing signal itself.

Prior art digital transmission systems generally do not transmit separate synchronizing signals. Instead, the transitions between signal-bits are detected by various means depending upon the type of received digital modulation, i.e. amplitude keyed, frequency-shift keyed or phase-pulse modulation. By whatever means the bit transitions are detected as pulses, they are coupled to a digital phase detector which determines whether a locally generated pulse wave leads or lags the transitions. The synchronization is performed by subtracting pulses from the locally generated pulse wave if the transitions were late with respect to the locally generated pulse wave or adding pulses to the locally generated pulse wave if the transitions were early with respect to the locally generated pulse wave.

SUMMARY OF THE INVENTION

The present invention provides an improved digital signal synchronizing system. In particular, a digitally controlled phase-locked-loop employs a reference crystal controlled oscillator at a frequency N times the data bit rate ($f_b$), a correction oscillator oscillating at a frequency $f_c$, binary gating circuitry to produce frequencies of $f_b \cdot N \pm f_c$, a N bit binary frequency divider and a digital phase detector to provide an output clock of frequency $f_b$ synchronized with the detected binary data being transmitted at a nominal bit repetition rate of $F_b$ wherein $f_b$ is approximately equal to $F_B$.

It is an object of the present invention to provide a digital synchronizing system in which an output signal is timed controlled to place it in phase synchronism with an input signal.

It is another object of the present invention to provide a digital synchronizing system in which an input digital signal is utilized to control the generation of a digital output signal and, in particular, where a digital phase-locked-loop is provided to establish phase synchronism between the digital input signal and the digital output signal.

It is a further object of the present invention to provide a digital synchronizing system wherein digital input signals are compared with a locally generated signal and wherein pulses are subtracted from the locally generated signal if the digital input pulses lag the locally generated signal and wherein pulses are added to the locally generated signal if the digital input pulses lead the locally generated signal.

It is still a further object of the present invention to provide an improved digital synchronizing system which includes a correction oscillator for controlling the bandwidth of the digital phase-locked-loop.

It is an object of the present invention to provide a digitally controlled phase-locked-looped which has a substantially constant phase versus frequency response over a desired frequency range.

It is still a further object of the present invention to provide a new and improved digital synchronizing system which is simple, reliable and economical.

DESCRIPTION OF THE DRAWINGS

For a better understanding of the invention as well as other objects and further features thereof, reference is made to the following description which is to be read in conjunction with the accompanying drawings wherein.

DESCRIPTION OF THE PREFERRED EMBODIMENT

Figure 1:
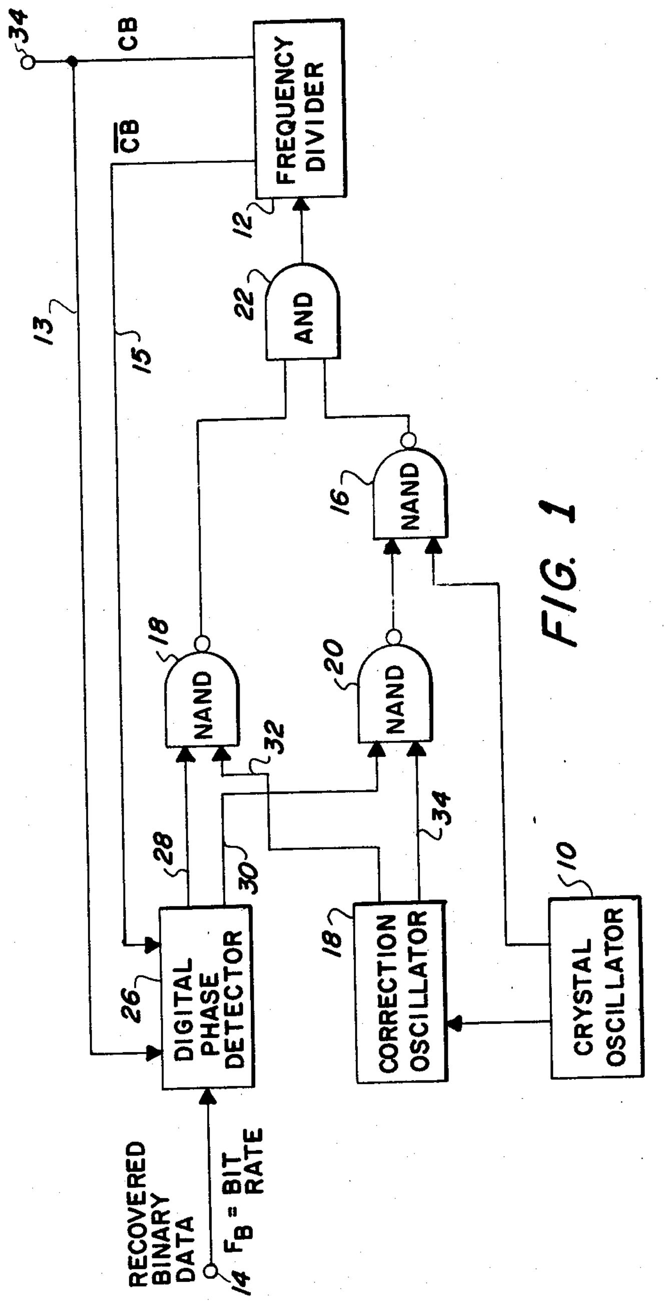
FIG. 1 is a block diagram of the novel digital phase-locked synchronizing system of the present invention.

Referring now to the block diagram of FIG. 1, the output of crystal oscillator 10 is adjusted to produce pulses having a frequency equal to $N \times f_b$ where N is the scale or stepdown ratio of frequency divider 12 and $f_b$ is chosen to be approximately equal to the bit rate $F_b$ of the recovered binary data appearing at input terminal 14. The output of crystal oscillator 10 is coupled to one input of NAND gate 16 and to correction oscillator 18. The correction oscillator 18 generates a pulse train of frequency $f_c$, the output thereof being connected to one input of NAND gates 18 and 20. The output of crystal oscillator 10 lightly synchs correction oscillator 18 to ensure that there is no time coincidence of correction oscillator pulses with the main crystal oscillator count pulses. The outputs of NAND gates 16 and 18 are coupled to the input of AND gate 22. The output of AND gate 22 is connected to the high frequency side of N bit frequency divider 12, the output $f_o$ thereof corresponding to the recovered bit clock. The N bit frequency divider generates two oppositely phased outputs on leads 13 and 15 which are connected to the input of digital phase detector 26, the recovered binary data being connected to the other input thereof. Digital phase detector 26, as will be described in more detail hereinafter with reference to FIG. 2, has two outputs, the output on lead 28 indicating that the input bit transitions lags the pulses generated by frequency divider 12 and the output on lead 30 indicating that the input bit transitions lead the pulses generated by frequency divider 12. The output on lead 28 is connected to the other input of NAND gate 18, the output on lead 30 being coupled to the other input of NAND gate 20. One output of correction oscillator 18 is coupled to the other input of NAND 18 via lead 32 and the other output of the correction oscillator is coupled to the other input of NAND gate 20 via lead 34.

In operation, the output of crystal oscillator 10 produces narrow (with respect to the oscillator period) output pulses at the rate of $f_b \cdot N$ ($f_b$ being the nominal binary data bit rate, 2,000 bits per second, for example). Typical values of $f_c$ and $N$ are 175 hertz and 200, respectively. These pulses pass into NAND gate 16 which is controlled by the output of NAND gate 20. The outputs of correction oscillator 18 appearing on leads 32 and 34 are narrow pulses, or impulses, corresponding to a "subtract" (delete) and "add" condition, respectively. Comparison of the recovered binary data bit rate (or the rate of the data bit transitions) at terminal 14 with the bit rate of the N frequency divider 12 in digital phase detector 26 produces an indication of either early (on lead 28) or late (on lead 30) phase of the output $f_o$ of frequency divider 12 with respect to the binary data bit rate. If the phase of $f_o$ is early, pulses will be deleted from the pulse train generated by crystal oscillator 10 such that the frequency of the output pulses of AND gate 22 is equal to $Nf_b - f_c$. If the phase of $f_o$ is late, pulses will be added to the pulse train generated by crystal oscillator 10 such that the frequency output of NAND gate 22 is equal to $Nf_b + f_c$. A detailed description of the operation of the block diagram will be given with reference to FIG. 3 hereinafter.

The output of AND gate 22 drives N bit frequency divider 12 at a rate above $N \cdot f_b$ if $f_o$ lags the bit transitions of the binary data and at a rate below $N \cdot f_b$ if $f_o$ leads the bit transitions of the binary data. Counting will continue at this rate until phase detector 26 produces an indication of the opposite phase condition. It should be noted that the instantaneous output of frequency divider 12 is never actually in synchronism with the input bit data rate but varies between $f_b \pm (fc/N)$, or for the parameters set forth hereinabove, approximately 0.04 percent of the desired value. This variance is well within the tolerance limits of most digital synchronizing systems. It should be further noted that the average value of $f_o$, the output of the divider, is equal to $F_b$.

The bandwidth of the digital phase locked-loop is determined by the frequency of correction oscillator 18 and step-down ratio N and is equal to $2fc/N$ or $\pm fc/N$. Therefore, the correction oscillator may be utilized to adjust the system response to accommodate for various binary data bit rates. In addition, the narrow bandwidth prevents extraneous bits produced by noise from affecting the phase of frequency divider 12. Steady-state phase error (jitter) Z is a constant for any system frequency difference between $F_b$ and $f_b$ up to $\pm f_{c/N}$ and is equal to $360/N$ degrees for input bit transitions at time intervals more frequent than $1/fc$, and increases in multiples of KZ ($K = 1, 2, 3 \ldots$) as input bit transitions became spaced at time intervals greater than $K/f_c$ (for $f_c$ less than $f_b/2$).

It has been determined that the present invention provides a steady state phase versus frequency response which is substantially constant over the range of operating frequencies. This feature reduces the parameters which effect phase error, thereby enabling accurate control of phase error by controlling the stepdown ratio $N$. As set forth hereinabove, adjustments of the output from frequency divider 12 is obtained by either adding or subtracting (deleting) pulses from its normally received sequence of input pulses from AND gate 22. Added pulses advance the output phase and deleted pulses retard the output phase. Digital phase detector 26 determines whether the divider input pulses should be added or subtracted. The output $f_o$ appearing at terminal 34 represents synchronized output pulses having an instantaneous frequency of $f_b \pm (fc/N)$ while the average rate is $f_b \pm (\leq fc/N)$. The output $f_o$ is commonly known as the bit clock (CB) and this terminology will be used hereinafter.

Figure 2:
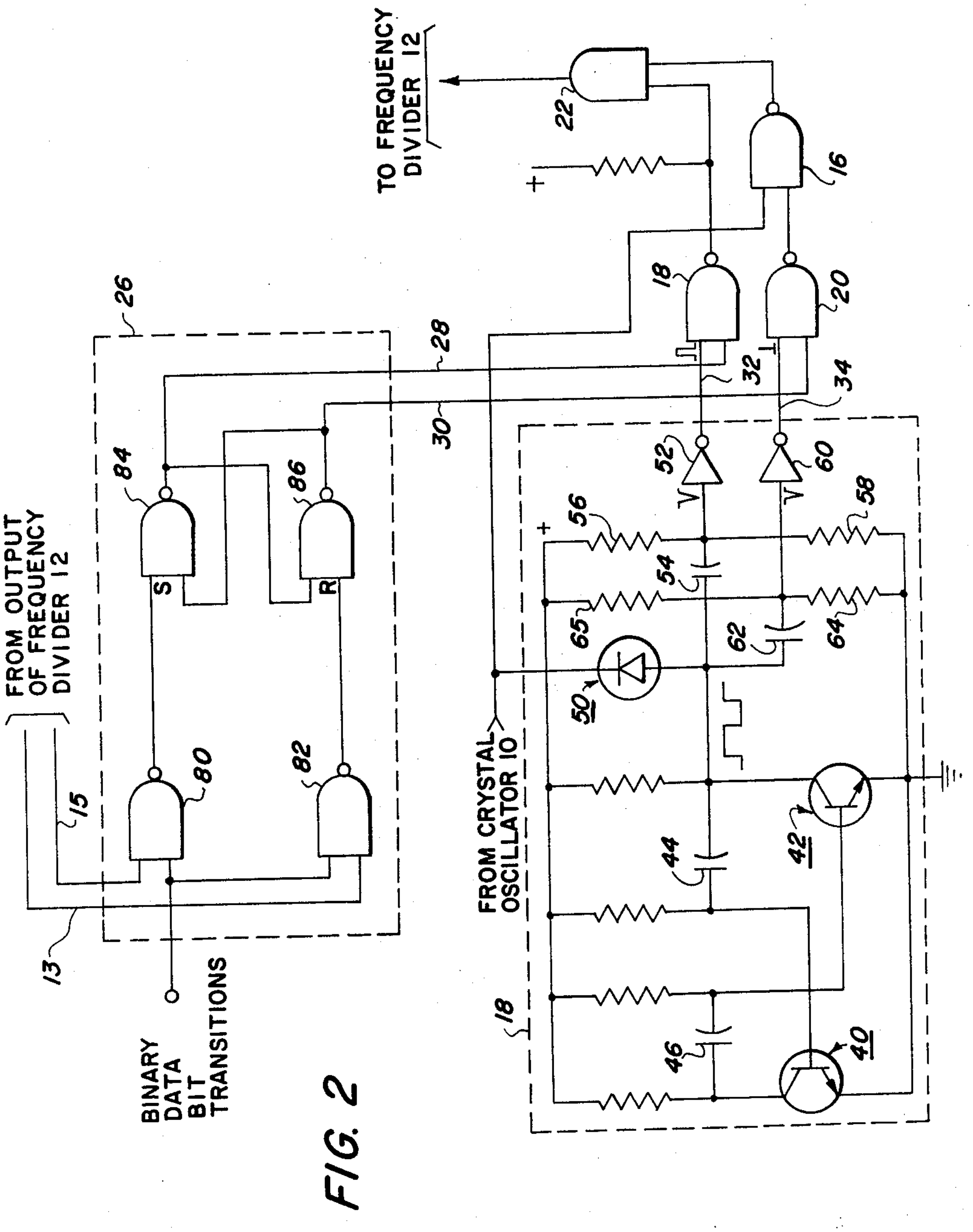
FIG. 2 is a schematic diagram of some of tHe block elements shown in FIG. 1.

Referring now to FIG. 2, a schematic diagram of the digital phase detector 26 and the correction oscillator 18 is shown, the binary gating circuitry being represented in block form. It should be noted that a detailed description of the specific circuitry for crystal oscillator 10, the binary gating circuitry and frequency divider 12 has not been set forth since they are components well known in the prior art. Correction oscillator 18 comprises a transistorized astable multivibrator including transistors 40 and 42. The base electrode of transistor 40 is coupled to the collector electrode of transistor 42 via capacitor 44 while the base electrode of transistor 42 is coupled to the collector electrode of transistor 40 via capacitor 46. The output of the astable multivibrator appearing at the collector electrode of transistor 42 is a pulse train, shown in an idealized form, having a frequency, for example, of 175 hertz. The collector electrode of transistor 42 is coupled to the anode of semiconductor diode 50, the cathode thereof being coupled to the output of crystal oscillator 10. As set forth hereinabove, the output of crystal oscillator 10 acts to lightly synch correction oscillator 18 with crystal oscillator 10 to ensure that there is no time coincidence of correction oscillator pulses with the main oscillator count pulses. This is accomplished in the following manner. The amplitude of the pulses in the pulse train generated by crystal oscillator 10 is selected to be much less that the amplitude of the pulses produced at the collector electrode of transistor 42. When the potential at the collector of transistor 42 is low the crystal oscillator pulses have no effect on the timing of oscillator 18 as diode 50 is reverse biased. When the potential at the collector of transistor 42 is high, current is caused to flow from the collector of transistor 42 through diode 50 when the output of oscillator 10 goes to the low state. These low amplitude pulses have no effect on the timing of oscillator 18 over the greater portion of the timing cycle. Just prior to the completion of the positive portion of the oscillator 18 cycle at the collector of transistor 42, the pulses occurring due to the action of oscillator 10 through diode 50 will cause oscillator 18 to switch slightly earlier than it would without sync; and in time synchronism with the leading edge of the pulses from oscillator 10. Since the circuitry following the collector of transistor 42 has a greater delay up to the input of frequency divider 12 than is presented to the output of oscillator 10, the effect of synchronizing the leading edge transitions at the collector of transistor 42 with the leading edge transition of oscillator 10 is to ensure that the resulting waveforms will not be in time coincidence at the input to frequency divider 12. The collector electrode of transistor 42 is also coupled to the input of inverter 52 via a first differentiating circuit comprising capacitor 54 and resistors 56 and 58. The input of inverter 60 is coupled to the collector electrode of transistor 42 via a second differentiating circuit comprising capacitor 62 and resistors 64 and 65. The differentiating circuits operate on the output pulses appearing at the collector electrode of transistor 42 to produce a series of narrow pulses occurring at the transition of the output pulses. The resistance and capacitance values of the differentiating circuits are chosen so that the time duration of the narrow pulses produced by the first differentiator circuit applied to inverter 52 is longer than the time duration of the narrow pulses applied to the input of inverter 60 by the second differentiating circuit. Inverter 52 inverts and shapes the pulses applied thereto, the output thereof being applied to one input of NAND gate 18. As will be described hereinafter, the pulse produced by inverter 52 is a "delete" or subtract pulse. The pulses applied to inverter 60 is inverted and applied to one input of NAND gate 20. This pulse is an "add" pulse. The output of NAND gate 20 is coupled to one input of NAND gate 16. The output of NAND gate 16 is connected to one input of AND gate 22, the output of which is coupled to the high frequency input side of frequency divider 12. The output of NAND gate 18 is coupled to the other input of AND gate 22. The output from crystal oscillator 10 is applied to the other input of NAND gate 16.

The binary data bit transitions are coupled to one input of NAND gates 80 and 82. The bit clock output of frequency divider 12 is coupled to the other input of NAND gate 82 via lead 13 while the oppositely phased bit clock output of frequency divider 12 is applied to the other input of NAND gate 80 via lead 15. The output of NAND gate 80 is coupled to one input of NAND gate 84 and the output of NAND gate 82 is coupled to one input of NAND gate 86. The outputs of gates 84 and 86 are cross-coupled together and operate essentially as a latch or flip-flop circuit with set and reset inputs as shown.

The operation of the novel digital synchronizing system of the present invention will now be described with reference to the waveforms shown in FIG. 3.

Figure 3:
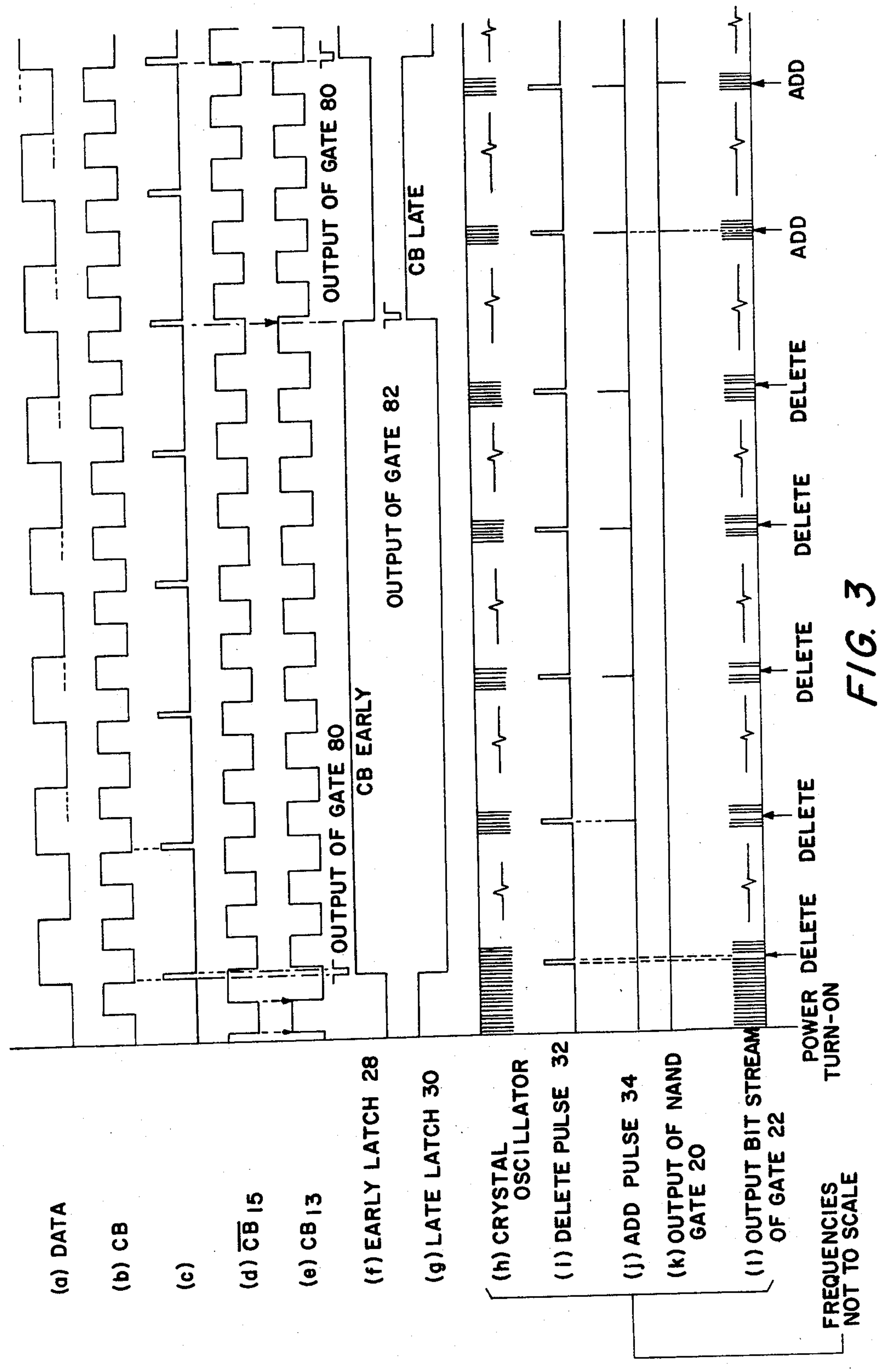
FIG. 3 illustrates the waveforms associated with the diagrams of FIGS. 1 and 2.

Referring now to FIG. 3, the waveform shown in FIG. 3 at (a) is a typical data pattern comprising an alternating pattern of binary ones (1) and zeros (0). The waveform in FIG. 3 at (b) shows the desired phase relationship between the data pattern and the bit clock.

As set forth hereinabove, the phase comparison is usually between the data bit transitions and the clock waveform. Pulses representing the transitions of the leading edges of the data pulses are shown in FIG. 3 at (c). A waveform pattern corresponding to the oppositely phased bit clock buffer signal, $\overline{CB}$, is shown in FIG. 3 at (d). The clock buffer signal, CB, produced on output lead 13 of frequency divider 12 is shown in FIG. 3 at (e).

NAND gates 84 and 86 form a latching or flip-flop circuit triggered by negative pulses generated by either NAND gate 80 or NAND gate 82. The output of NAND gate 84 represents the condition wherein the bit clock is early, or leads the data transitions, the output of NAND gate 86 representing the condition wherein the bit clock is late, or lags, the data transitions.

The waveforms shown in FIG. 3 assume that when the circuit is initially turned on, the bit clock lags the data transitions. At this time, the output of NAND gate 82, initially zero, does not change. However, the oppositely phased clock buffer, $\overline{CB}$, leads the data transitions. This causes a negative pulse to be generated at the output of NAND gate 80 (shown below FIG. 3 at (e)) which in turn switches the output of NAND gate 84 from zero initially to binary one, as shown in FIG. 3 at (f). Since NAND gates 84 and 86 are interconnected as a latch or flip-flop circuit, the output of NAND gate 86, initially a binary one, is driven to zero as shown in FIG. 3 at (g). The output of crystal oscillator 10, shown in FIG. 3 at (b), generates the delete and add pulses shown in FIGS. 3 at (i) and 3 at (j), respectively, as explained hereinabove. For example, the delete pulses would have a duration of approximately 2.5 microseconds for a 400 KHz crystal oscillator frequency while the add pulses have a duration of approximately 100 nanoseconds. The input to NAND gate 18 comprises the delete pulses and the early latch signal shown in FIG. 3 at (f). The output of NAND gate 18 is zero at the time of the delete pulses for a positive early latch signal. This zero signal disenables AND gate 22 during its time duration. At this time, the input to NAND gate 20 comprises the add pulses shown in FIG. 3 at (j) and the zero late latch signal shown in FIG. 3 at (g). For these conditions, NAND gate 20 is enabled as shown in FIG. 3 at (k). The positive, or binary one, output of NAND gate 20 is connected to one input of NAND gate 16. The crystal oscillator output is passed to the other input of AND gate 22 via NAND gate 16. Since the output of NAND gate 18 is zero for a period of time equal to the time duration of the delete pulses, which corresponds to deleting one count pulse from oscillator 10, the frequency output of AND gate 22 shown in FIG. 3 at (l) is equal to the crystal oscillator frequency minus the frequency of the delete pulses, i.e. $Nf_b - f_c$.

The above process of deleting pulses is repeated until the bit clock leads the data transitions. In this situation, time coincident voltages appearing at the input of NAND gate 82 cause a negative pulse (shown below FIG. 3 at (f)) to be produced. This negative pulse resets the latch circuit causing the latch output of NAND gate 86 to be switched from zero to binary one as shown in FIG. 3 at (g); the output of NAND gate 84 being driven to zero.

The inputs to NAND gate 18, the delete pulses and the early latch signal, produces an output at NAND gate 18 which enables AND gate 22 for the time duration of the late latch signal.

The inputs to NAND gate 20, the add pulses and the late latch signal, disables NAND gate 20 for the time duration of the add pulse. The output of NAND gate 16 therefore represents the frequency of the crystal oscillator to which is added the frequency of the add pulses. The output of AND gate 22, shown in FIG. 3 at (l), is identical to the output of NAND gate 16 since gate 22 is enabled by the output of NAND gate 18 during the time that the late latch output is at binary one. The frequency at the output of AND gate 22 is therefore $Nf_b + f_c$.

While the invention has been described with reference to its preferred embodiment, it should be understood by those skilled in the art that various changes in form and details may be made without departing from the true spirit and scope of the invention. All such modifications, etc. are considered to be within the scope of the present invention as defined by the claims appended hereto.

What is claimed is:

1. A digital signal synchronizing system comprising::

a. means for receiving data signals having a bit rate $F_b$, b. first means for locally generating a pulse signal train having a frequency equal to N times $f_b$ wherein $f_b$ is approximately equal to $F_b$, c. second means for locally generating a pulse signal train having a frequency $f_c$ wherein $f_c$ is less than $f_b$, said second generating means comprising an astable multivibrator and further including first and second differentiating means coupled to the output of said multivibrator, the output of said first generating means synchronizing said second generating means whereby coincidence between the output pulses produced by said first and second generating means is prevented, d. frequency divider means for locally generating a master timing pulse signal train having an instantaneous frequency of $f_b \pm (f_c/N)$, e. digital logic means for comparing the time phase relationship between each data signal transition and each pulse in said master pulse signal train, and f. gating means coupled to the output of said first and second generating means and said comparing means for producing pulse trains having frequencies $Nf_b + f_c$ and $Nf_b - f_c$, respectively, said gating means passing the pulse train having the frequency $Nf_b + f_c$ to said master timing generating means if the output of the master timing generating means lags the input data binary bit rate and for passing the pulse train having the frequency $Nf_b - f_c$ to the master timing generating means output if said master timing generating means leads the input data binary bit rate, said gating means comprising first and second NAND gates one input of which is coupled to the output of said first and second differentiating circuits, respectively, means for connecting the other input of said NAND gates to the output of said comparing means, means for connecting the output of said first NAND gate to one input of an AND gate, a third NAND gate having one input connected to the output of said second NAND gate, means for connecting the output of said first generating means to the other input of said third NAND gate, means for connecting the output of said third NAND gate to the other input of said AND gate and means for coupling the output of said AND gate to the input of said master timing generating means.

* * * * *

UNITED STATES PATENT OFFICE
CERTIFICATE OF CORRECTION

Patent No. 3,671,776 Dated June 20, 1972

Inventor(s) Robert D. Houston

It is certified that error appears in the above-identified patent and that said Letters Patent are hereby corrected as shown below:

In Column 5, line 2 delete "lags" and insert --leads--. On line 3 delete "zero" and insert --high or binary 1-- therefor. On line 5 insert --also-- after "CB,". On line 12 delete "crystal oscillator 10, shown in Fig. 3 at (b)," and insert therefor --correction oscillator 18--. On line 25 insert --the output of-- after "conditions,". On line 25 delete "enabled" and insert --binary 1-- therefor. On line 36 delete "leads" and insert --lags-- therefor.

Signed and sealed this 16th day of April 1974.

(SEAL)
Attest:

EDWARD M.FLETCHER,JR.
Attesting Officer

C. MARSHALL DANN
Commissioner of Patents